Figure 1:
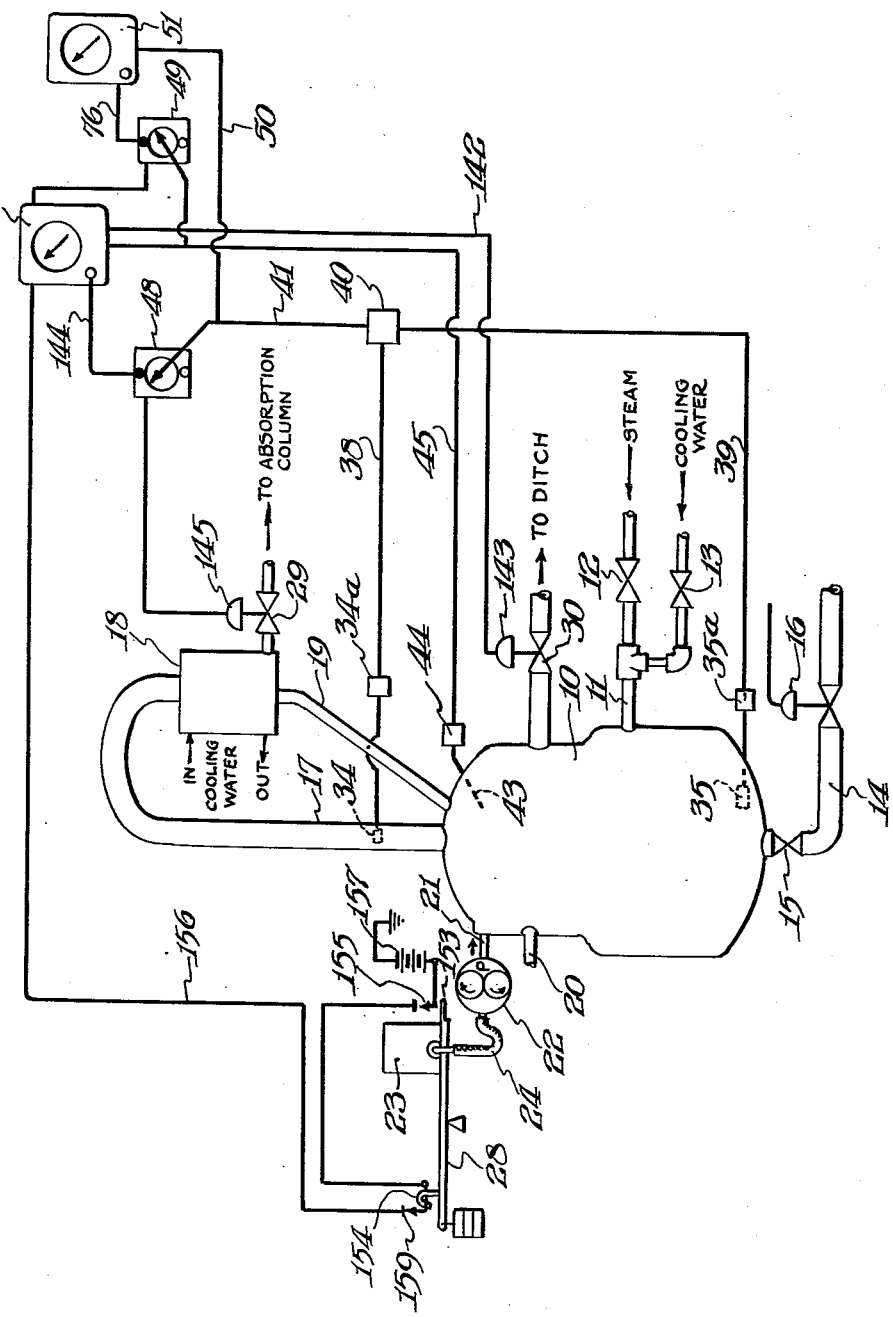

Oct. 1, 1957  E. B. HALL  2,808,316
CHEMICAL PROCESS CONTROL APPARATUS
Filed July 22, 1954  3 Sheets-Sheet 2

INVENTOR
Edgar B. Hall
BY Harry J. McCauley
ATTORNEY

Oct. 1, 1957

E. B. HALL 2,808,316

CHEMICAL PROCESS CONTROL APPARATUS

Filed July 22, 1954

3 Sheets-Sheet 3

INVENTOR
Edgar B. Hall

BY Harry J. McCauley

ATTORNEY

United States Patent Office 2,808,316
Patented Oct. 1, 1957

2,808,316

CHEMICAL PROCESS CONTROL APPARATUS

Edgar B. Hall, Wilmington, Del., assignor to E. I. du Pont de Nemours and Company, Wilmington, Del., a corporation of Delaware Application July 22, 1954, Serial No. 445,043

5 Claims. (Cl. 23—252)

This invention relates to a chemical process control apparatus, and particularly to a chemical process control apparatus for use in connection with processes wherein a dependent relationship exists between two or more process variables and it is desirable to maintain a control over one or more of the variables on the basis of the relationship of this variable with the other variables.

There are numerous chemical processes in which a dependent relationship exists between two or more process variables and wherein it is desirable to maintain a control over one or more of the variables on the basis of the relationship of this variable with the other variables. This method of control is particularly applicable to the situation where the composition of a continuously flowing liquid stream is to be controlled on the basis of pH, and like operations wherein the relationship between the variables is non-linear. One very important application of this method is that of the control of exothermic chemical reactions which, once initiated, proceed more or less spontaneously with concomitant rise of both temperature and pressure to levels which might exceed a desirable limit productive of optimum yield of a desired product or a safety limit necessary to personnel or equipment protection. Typical of such reactions are those which include the oxidation or nitration of hydrocarbons, and the following detailed description relates specifically to control according to this invention of the nitric acid oxidation of para-xylene to manufacture terephthalic acid.

Figure 2:
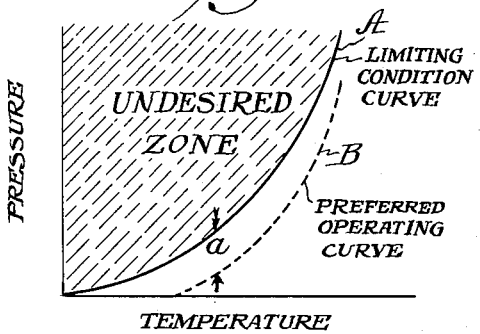
Figure 3:
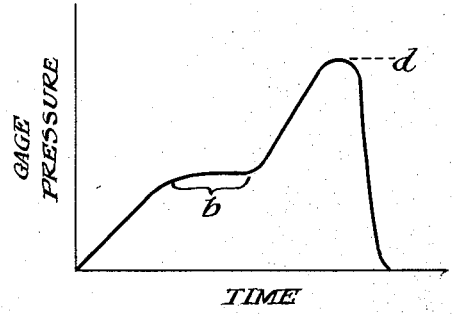
Figure 4:
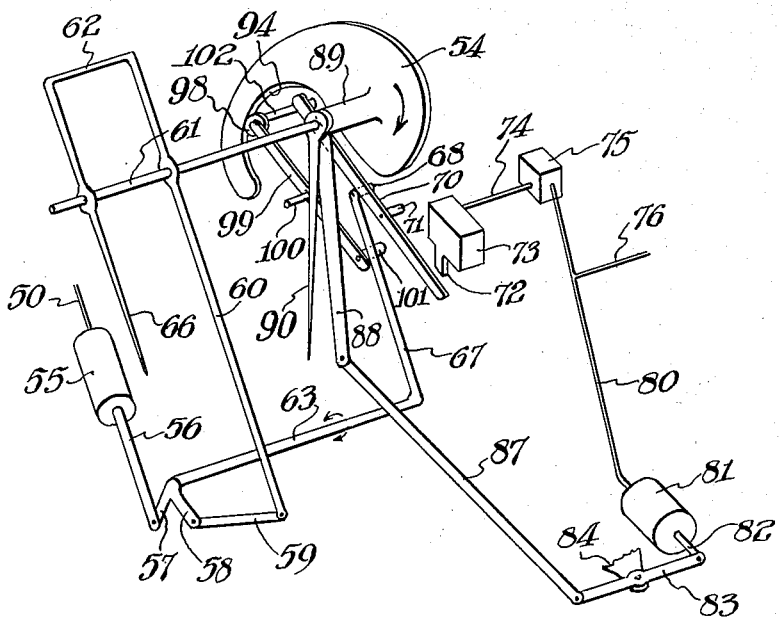
Figure 5:
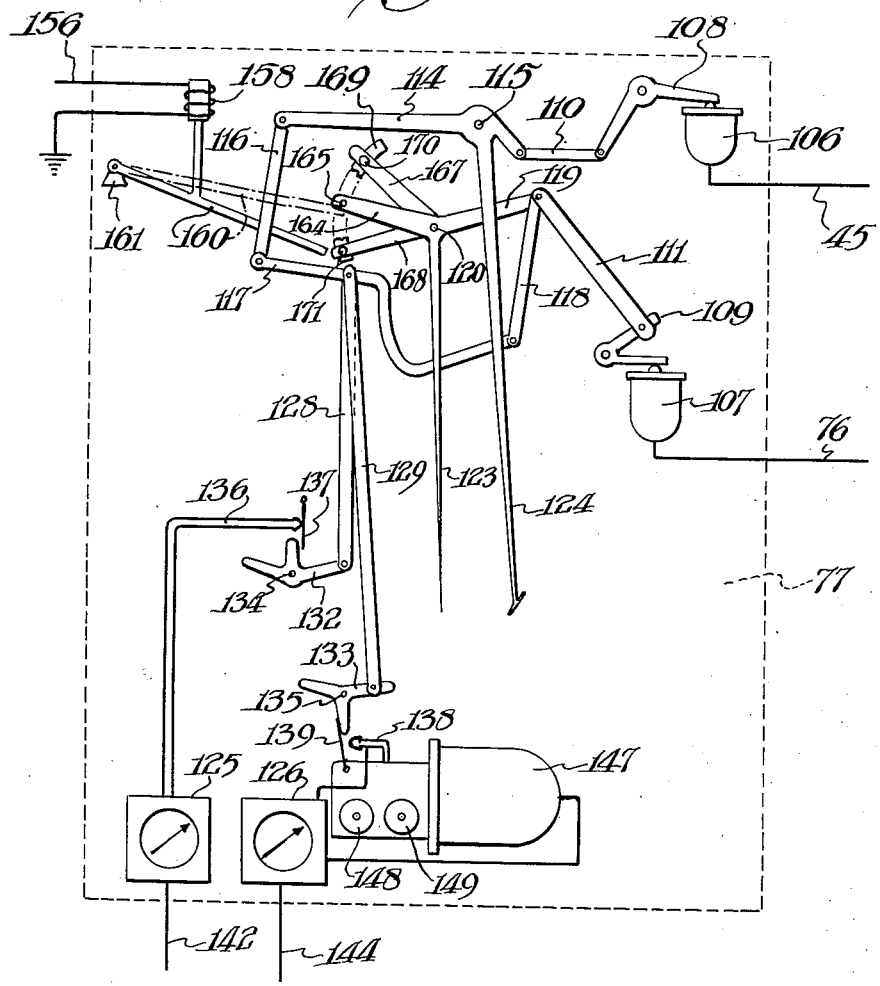

Among the objects of this invention are the provision of a chemical process control apparatus which will automatically maintain one or more of the process variables in a predetermined relationship to other process variables as to which interdependency exists, the provision of a control apparatus for chemical processes which is adapted to interlocking connection with reactant feed mechanisms to superimpose a desired pattern of variable maintenance over a preselected part of the reaction cycle, and the provision of a control apparatus as described which is dependable in operation, adapted to manual supervisory control, if desired, and which utilizes as many of its components commercially available apparatus. The manner in which these and other objects of this invention are attained will be apparent from the detailed description read in connection with the following drawings, in which:

Fig. 1 is a partially diagrammatic representation of an apparatus for the oxidation of para-xylene to manufacture terephthalic acid in which a preferred embodiment of pneumatic control apparatus according to this invention is employed, the several components of the control apparatus being indicated in block representation and all air supply connections being eliminated from the showing for simplicity in representation, Fig. 2 is a plot of the limiting safe operating curve, indicated at A, and a preferred more conservative safe operating curve, indicated at B, for the oxidation of para-xylene to manufacture terephthalic acid, Fig. 3 is a typical pressure-time plot of a para-xylene oxidation to terephthalic acid manufacturing cycle whereain nitric acid reactant addition interlocking control is superimposed on the usual control achieved by the apparatus of this invention, Fig. 4 is a somewhat schematic perspective representation of a device utilized in the apparatus of this invention for the characterization of the process to be controlled in terms of a temperature-preselected pressure relationship, and Fig. 5 is a partially diagrammatic representation of a pressure controller responsive to the characterization apparatus of Fig. 4.

Generally, the objects of this invention are attained by providing an apparatus which senses a signal corresponding to each of several mutually dependent process variables, characterizes one of these signals so as to obtain a signal corresponding to a predetermined value of one or more of the other of said process variables, obtains a control signal which is the result of the comparison of the signal obtained from said characterizing and the signal corresponding to the existing value of said one or more of the other of said process variables, and controls said one or more of the other of said process variables in response to said control signal. The invention is thus adapted to maintain a preselected process variable interrelationship. As a practical matter, control based on a particular one of a pair of mutually dependent process variables might be preferred, as in the case of temperature and pressure in the oxidation of para-xylene to manufacture terephthalic acid. In this reaction it is preferred to base control on the temperature rather than the pressure, because of the fact that the pressure in this reaction is capable of sudden changes of considerable magnitude and better control is possible by regulation of the pressure than could be secured by temperature regulation.

In the preferred embodiment of this invention hereinafter described in detail as applied to the control of the nitric acid oxidation of para-xylene to terephthalic acid, a pneumatic control apparatus is employed; however, it will be understood that equivalent electrical or other control apparatus can be substituted for pneumatic, providing the same control functions are performed.

Referring to Fig. 1, the nitric acid oxidation of para-xylene is shown as carried out in a jacketed reactor 10, although a reactor provided with internal cooling coils might be utilized instead, if desired. Initially, a small amount of nitric acid is supplied to reactor 10 through gear pump 22, after which the full charge of para-xylene is introduced into the reactor through line 20. The oxidation reaction is then initiated by introducing steam through line 11 into the jacket of the reactor by opening steam supply valve 12. Line 11 is manifolded with a cooling water supply line provided with a control valve 13, so that steam supply can be discontinued and cooling water supplied to the jacket whenever it is desired to remove excess heat from the reaction zone. Once initiated, the oxidation of para-xylene proceeds simultaneously with an accompanying rise in temperature and pressure, thereby boiling off the more vaporous products of the reaction, which vapors are drawn off through vapor take-off line 17 opening into indirectly cooled condenser 18 where condensation occurs with return of condensate to reactor 10 through line 19. To maintain control over the reaction, it is desirable to introduce the nitric acid at a controlled continuous rate, which is accomplished by regulation of the speed of gear pump 22. The inlet of pump 22 is connected to acid charge retaining weigh tank 23 carried by scale beam 28, the delivery of acid being through a flexible connection indicated generally at 24 connected to line 21 ahead of pump 22. The reactor is provided with a product discharge line 14 having a manual discharge valve 15 to permit dumping the reactor upon completion of the manufacturing cycle and a pneumatically operated valve 16 to control the discharge rate so as to maintain the pressure in downstream receiving equipment (not shown) within desired limits.

Since the pressure would rise to uneconomical and even dangerous limits if proper control and pressure relief mechanisms were not provided, pneumatically operated valve 29 is provided in communication with condenser 18 to permit throttling withdrawal of off gas, and on-off pneumatically operated valve 30 is provided in open communication with the interior of reactor 10 for emergency dumping of the reactor charge if pressures develop beyond the range of the dissipation of valve 29. The off gas from reactor 10 comprises oxides of nitrogen which can profitably be recovered by absorption in an appropriate solvent and valve 29 may conduct the off gas to a suitable absorption recovery column not shown. Emergency valve 30 may dump the reactor contents to a run-off ditch or other emergency disposal area away from the building housing equipment and personnel.

Referring to Fig. 2, it is possible to plot the relationship of pressure to temperature for reactions of the type represented by the oxidation of para-xylene to terephthalic acid above which it is uneconomical or unsafe to conduct the reaction, while more desirable results are obtained by operation in the zone defined to the right of the limiting condition curve, which is designated A in the figure for convenience of reference. The preferred operating curve might, for example, be that represented by B which is displaced from curve A along the vertical, or pressure, axis an amount $a$, which may advantageously be of the order of 50 lbs./sq. in. pressure difference. For conservation of reactants and ease of recovery of off gases, the valve 29 is set to throttle when the control pressure for the valve signals a pressure corresponding to sensed temperature which falls on curve B, while on-off pressure relief valve 30 is set to open whenever the sensed pressure in the reaction zone attains a value on curve A corresponding to the sensed temperature, valve 30 then dumping the contents of reactor 10 to a safe disposal ditch. In practice, it is desirable to superimpose an additional control on the reaction whereby the pressure is maintained substantially constant over a portion of the cycle, once the reaction has been initiated, during which the bulk of the nitric acid introduction is completed before the pressure is again allowed to rise, this stage being indicated by the region delineated $b$ in Fig. 3. Thus, the plot of Fig. 3 wherein pressure is plotted as the ordinate against time as the abscissa represents a preferred control pattern, it being understood that the corresponding existing temperature might also be plotted adjacent pressure on the ordinate scale but to a different numerical scale. When the pressure in reactor 10 attains, and holds to, the value represented by $d$ for a time which experience has shown results in essential completion of the reaction with economical yields, the operator cools the charge by opening valve 13 and then dumps the charge by opening valve 15, after which discharge to receiving equipment is controlled responsive to the existing pressure therein by pneumatically operated valve 16.

It should be emphasized that the pressure-time relationship for the reaction cycle depicted in Fig. 3 might vary substantially from cycle to cycle because of differences in strength of the reactants processed, differences in efficacy of agitation or other factors which are difficult, if not impossible, to control, and control according to this invention constitutes a very effective method of lumping the various parameters which affect the pressure build up in the reactor at any finite stage of the reaction.

Referring to Fig. 1, the control system of this invention utilizes two temperature-sensing elements, the first of which, indicated at 34, is employed to determine the temperature of the vapor withdrawn through take-off line 17, while the second, indicated at 35, senses the temperature of the liquid in reactor 10. It will be understood that, in practice, only one temperature sensing element need normally be employed; however, since there is sometimes a substantial difference between the temperature of the exhaust vapor and the liquid reactants, it is preferred to sense both and control to the lowest of the two. For the pneumatic system, hereinafter described in detail, the temperature sensing elements may be of the Taylor Instrument Co. Temperature Transaire Model 317RG128 type, which individually include associated force balance auxiliaries, indicated at 34a and 35a, respectively, which each deliver an output signal through signal lines 38 and 39 to discriminator 40, which may be a Moore Products Co. Revised Model 61, 1:1 pneumatic relay which transmits the lower of the two input signals as the control signal in terms of temperature to the subsequent apparatus through line 41. The other control signal for the system is the sensed reaction pressure which is applied by open line 43 to pressure sensing element 44, which may be a Republic Flowmeter Co. Pressure Transmitter Model P-2326-2, and delivered as a pneumatic output signal to the control system through line 45.

It is desirable to provide manual supervisory control devices 48 and 49, the purpose of which will be hereinafter described in greater detail, in each of the control signal circuits, and these may conveniently be Taylor Instrument Co. Transet Indicators, Model 60KF25, which are modified by plugging the No. 2 ports and removing the valve set springs.

The pneumatic temperature signal output from line 41 is supplied through branch line 50 to means characterizing the chemical process to be controlled in terms of the temperature-preselected pressure relationship (curve B of Fig. 2), indicated generally at 51, which is shown in detail in Fig. 4.

The function of the characterization apparatus 51 is to deliver a signal which corresponds to a pressure on curve B matching with the lowest temperature sensed by the temperature sensing elements 34 and 35, and the apparatus may conveniently be a Foxboro Pneumatic Receiver Characterized Transmitter which incorporates a control cam 54 which is adapted to produce an output signal that is at all times representative of a pressure corresponding to the sensed temperature conforming to curve B of Fig. 2.

In Fig. 4, the input signal from line 50 is converted to linear movement through the agency of bellows motor 55, the piston rod 56 of which is pinned to one arm 57 of bell crank 63 journaled in a bearing not shown. A second arm 58 pinned to link 59 connects the bell crank to the lower end of pivotal member 60 journaled on shaft 61. The upper end of member 60 is fixedly secured by connection 62 to the upper end of a pointer 66, journaled for rotation on shaft 61, which is adapted to indicate the lowest sensed temperature by movement adjacent to an appropriately calibrated scale, not shown.

The opposite arm 67 of bell crank 63 is provided at its outer extremity with a pin 68 underlying one end of a flapper member 70 journaled for rotation about a fixed pin 71. The other end of flapper 70 is disposed adjacent an air escape nozzle 72 to thereby throttle the escape of air therethrough as a function of the angular position of member 70.

Nozzle 72 is supplied with air from a conventional air pilot mechanism 73 supplied in turn from a pilot relay 75 through line 74. The output from pilot relay 75 is directed as one control signal through line 76 via manual supervisory control 49 to the pressure controller hereinafter described, indicated generally at 77. A part of the output of 75 is also impressed as feedback through line 80 on bellows motor 81 where it is converted to linear movement of bellows piston rod 82. Piston rod 82 is pinned to one end of balance arm 83 pivoted on fixed support 84, while the other end of arm 83 is pinned to link 87. The other extremity of link 87 is pinned to the actuating arm 88 which is integral with hub 89 of cam 54, hub 89 being journaled on an extension of shaft 61. A pressure indicating pointer 90 is fixedly secured to the end of hub 89 in a position to indicate the predetermined pressure position of cam 54 by movement adjacent a properly calibrated scale, not shown.

The guiding contour edge 94 of cam 54 is machined to a shape which, in conjunction with the linkage system 82, 83, 87, and 88, and follower 98, will, on progressive movement of the cam in the direction indicated by the arrow adjacent the cam, develop an output signal through line 76 corresponding to a pressure varying in accordance with curve B with respect to the sensed temperature from one of the pair of temperature-sensing elements 34, 35 as represented in Fig. 2. The follower 98 is provided for coaction with cam edge 94 to restore flapper member 70 to equilibrium position with respect to nozzle 72 by a feed-back follow-up action following movement of cam 54. Follower 98 is fixedly mounted at one end of a supporting bar 99 journaled for rotation on fixed pin 100, the other end of the bar being provided with a pin 101 underlying arm 67 of bell crank 63. The follower is provided with a pin 102 underlying the end of flapper member 70 opposite nozzle 72. The disposition of flapper 70 and arm 67 with respect to pins 68, 101 and 102 is such that pins 68 and 101 permit rotational movement of flapper 70 over the complete range of travel of arm 67, while pin 102 restores flapper member 70 to equilibrium position under the deflection of follower 98 by cam 54 over the same range.

Referring to Fig. 5, the pressure controller of this invention may be a Brown Instrument Company receiver recorder of the duplex control type, Model

X–702P8N–84(P2)(74)

This instrument is provided with a bellows motor 106, responsive to the sensed pressure signal received from line 45, and bellows motor 107 responsive to the characterized pressure signal received from the characterization device 51 through line 76. The linear motion outputs of these bellows motors are applied through bell crank 108-link 110 and bell crank 109-link 111, respectively, to a linkage system by which the two forces are opposed. This linkage system comprises a main link 114 journaled on pin 115, which is connected through a subsidiary linkage system comprising members 116, 117 and 118 to the same end of a T-shaped member 119 to which the outer end of the link 111 is pinned. Member 119 is pivotally supported on pin 120 and is provided with an integral set point index pointer 123. Link 114 is similarly provided with an integral recording pen pointer 124, which is adapted to trace out a record of the existing pressure sensed by pressure sensing element 44 on a suitable chart, not shown. It will be understood that an increase in the magnitude of the pressure signal received through line 45 drops link 117 a proportionate amount, which movement is opposed by an increase in magnitude of the characterized pressure signal received through line 76, whereupon the resultant vertical displacement of link 117 is proportionate to the difference in the magnitudes of the existing pressure and the characterized pressure.

The movement of link 117 under the balancing action of the pressure forces is employed to actuate throttling valve 29 and on-off valve 30 through the agency of relay and output gage devices 125 and 126, which may be Brown Instrument Co. nonbleed booster pilot relays. These devices are actuated from link 117 through mechanical connection of the latter with links 128 and 129, which are pinned to the ends of flapper-biasing members 132 and 133, pivoted on pins 134 and 135, respectively. Relay 125 is provided with an air escape nozzle 136 throttled by a pivoted flapper member 137, and relay 126 is similarly equipped with a nozzle 138 throttled by a flapper 139. As shown in Figs. 1 and 5, the output from relay 125 is impressed through line 142 on the control diaphragm 143 of on-off valve 30. The output of relay 126 is similarly impressed through line 144 via manual supervisory control 48 to the control diaphragm 145 of throttling valve 29. Normally, as shown in Fig. 5, member 132 remains clear of flapper 137 and no air flow thus ensues through nozzle 136, whereupon valve 30 remains closed.

To achieve throttling control for valve 29 a conventional controller unit, indicated generally at 147, is utilized, this mechanism being a 1 to 150% proportional band and manual reset type which is integral with the Brown pressure controller model hereinabove specified. The proportional band adjustment knob for controller unit 147 is indicated at 148, while the manual reset knob is indicated at 149.

As hereinbefore mentioned, it is desirable to superimpose an additional control on the reaction whereby the pressure is maintained substantially constant over a portion of the cycle during the period in which the bulk of the nitric acid is introduced to reactor 10. As shown in Fig. 1, scale beam 28 is provided with two actuators 153 and 154, the first of which, 153, is adapted to close a normally open switch 155 to close the circuit through line 156 between power source 157 and the coil of solenoid 158 mounted within the case of controller 77. A second normally closed switch 159 is connected in series between switch 155 and line 156, this switch being spring-biased or otherwise retained in closed circuit position until opened by actuator 154 when the weight of nitric acid within weigh tank 23 decreases under feed to an amount which may safely be supplied to the reaction under increasing pressure conditions.

As shown in Fig. 5, the core of solenoid 158 is integral with stop bar 160 which is pivoted for movement as a lever on stationary support 161. The free end of bar 160 in raised position, indicated in broken line representation in Fig. 5, underlies arm 164 of member 119, and arm 164 is provided at the end with a pin 165 against which the end of 160 is adapted to abut and thereby prevent controller 77 from responding to an increase in magnitude of the signal derived from line 76 whenever both of the switches 155 and 154 are closed. Accordingly, with solenoid 158 actuated, the pressure in reactor 10 will be maintained substantially constant as indicated over the region b of Fig. 3. When the weight of nitric acid retained in weigh tank 23 decreases to an amount of about 20% of the total acid to be charged, scale beam 28 tilts in the counterclockwise direction, thus opening switch 159 by movement of actuator 154, whereupon the pressure again increases with temperature to level d, Fig. 3, at which time the reaction is essentially completed.

As shown in Fig. 5, controller 77 is provided with a pair of conventional limit stops 167 and 168, which are journaled on pin 120 and are adapted to be set in fixed relationship by clamping engagement of the split outer ends of the stops with an adjacent arcuate scale member 169, shown partially broken away, by tightening thumb screws 170 and 171, respectively.

In operation, it will be understood that the temperature is continuously sensed by temperature sensing elements 34 and 35, and the lowest of the temperatures is transmitted as the pneumatic control signal through lines 41 and 50 to characterization means 51.

At the same time, a pressure signal is continuously sensed by element 44 and transmitted through line 45 to controller 77. A characterized pressure output signal is transmitted by characterization means 51 through line 76 to controller 77, wherein it is opposed through the linkage system hereinabove described to the pressure signal input from element 44.

As indicated in Fig. 3, the pressure in reactor 10 increases up to the beginning of zone b, steam being fed to the jacket of the reactor through valves 12 and line 11 for a sufficient interval during this time to initiate the reaction, after which the reaction proceeds exothermically. The construction of the linkage system and member 119, shown in Fig. 5 is such that member 119 progressively rotates in a counterclockwise direction about pivot 120 as the reaction proceeds. The pressure in reactor 10 is at atmospheric level at start up, under which conditions limit stop 167 is not utilized; however, limit stop 168, secured in fixed position with respect to scale 169 by thumb screw 171, is employed to define the limit of movement of member 119 at the end of the manufacturing cycle. The position of arm 164 during rotational movement is indicated numerically by its location adjacent scale 169.

When the threshold of zone b (Fig. 3) is arrived at, a control based on the amount of nitric acid still in weigh tank 23 is superposed on the system through the electrical circuit including switch 155, switch 159 and solenoid 158. The solenoid being actuated, stop bar 160 is raised to the position indicated in broken line representation to abut pin 165 carried by arm 164, thereby stopping further rotational movement by member 119 and thus maintaining the pressure substantially constant over the region b. When the solenoid circuit is opened by the opening of switch 159 by actuator 154, stop bar 160 drops free to a position, shown in full line representation in Fig. 5, where it no longer contacts pin 165 on further movement of arm 164, and the pressure in reactor 10 increases upon further addition of nitric acid to the level denoted d in Fig. 3. At the end of the reaction pin 165 abuts limit stop 168 and thereby bars further rotational movement of arm 164, so that the maximum pressure maintained in reactor 10 is held substantially constant at level d. After an interval of time which experience has shown results in production of high quality product, the operator cools the reactor charge by introducing cooling water into the jacket of reactor 10 via valve 13 and line 11, after which he opens valve 15 in line 14, allowing the pressure in reactor 10 to drop under automatic control of valve 16 to atmospheric level thus dumping the charge to product receiving equipment, after which the oxidation cycle may be repeated.

It will be understood that, due to the exothermic nature of the reaction, the pressure and temperature in reactor 10, from the initiation of the reaction to its completion, tend to increase along a steep curve which, unless controlled, would lie in the undesired region to the left of curve A, Fig. 2. The control apparatus of this invention, by manipulation of valves 29 and 30 in response to the lowest sensed temperature and the sensed existing pressure, maintains a pressure-temperature relationship which normally conforms generally to curve B, while at the same time imposing an absolute limit on increase in pressure above the desired pressure-temperature pattern, which limit is defined by curve A.

Manual supervisory control devices 48 and 49 permit the operator to take over the control automatically imposed by the apparatus by cutting out either the characterized pressure control signal output of characterization means 51 or the output from controller 77 to throttling valve 29, or both. Conditions may sometimes make it desirable to control operations manually, such as, if characterization means 51 is for any reason taken out of service for maintenance or the like. In this event, control air for both of the valves 29 and 30 is still supplied through control devices 48 and 49 and the operator can manually adjust the settings to the required position by reference to a plot of pressures corresponding to temperatures conforming to curve B of Fig. 2, it being understood that when devices 49 alone is employed, emergency valve 30 is still actuated automatically by controller 77 to provide the upper pressure safeguard for the system. Utilization of device 48 in conjunction with 49 subjects the system to manual control solely.

From the foregoing, it will be understood that this invention may be modified in many respects within the skill of the art without deviation from the essential spirit, wherefor it is intended to be limited only within the scope of the appended claims.

What is claimed is:

1. A control apparatus for a chemical process in which a mutually dependent relationship exists between two or more process variables comprising, in combination, individual sensing means for each of at least two of said process variables delivering output signals representative of the magnitudes of said process variables, one of said process variables being the variable upon which control is based and one or more of said other process variables being variables which are to be controlled, means responsive to the signal representative of said variable upon which control is based characterizing said chemical process in terms of a preselected process variable interrelationship, said last-mentioned means delivering a characterized output signal corresponding to the value of said variables which are to be controlled at the existing magnitude of said variable upon which control is based, means responsive to the output signals of the sensing means for said variables which are to be controlled and to said characterized output signal for deriving a difference signal, and means responsive to said difference signal for controlling the magnitude of said process variables to be controlled to substantial conformity with said preselected process variable interrelationship.

2. A control apparatus for a chemical process in which a mutually dependent relationship exists between two process variables comprising, in combination, individual sensing means for each of said two process variables delivering output signals representative of the magnitudes of said process variables, the first of said process variables being the variable upon which control is based and the second of said process variables being the variable which is to be controlled, means responsive to the signal representative of said first process variable characterizing said chemical process in terms of a preselected interrelationship between said first process variable and said second process variable, said last-mentioned means delivering a characterized output signal corresponding to said second process variable at the existing magnitude of said first process variable, means responsive to the output signal representative of said second process variable and to said characterized output signal for deriving a difference signal, and means responsive to said difference signal for controlling the magnitude of said second process variable to substantial conformity with said preselected interrelationship between said first process variable and said second process variable.

3. A control apparatus for a chemical process in which a mutually dependent relationship exists between the process temperature and the process pressure comprising, in combination, process temperature sensing means and process pressure sensing means in communication with the reaction zone in which said chemical process is conducted, said temperature sensing means delivering an output signal which is a function of the temperature existing in said reaction zone and said pressure sensing means delivering an output signal which is a function of the pressure existing in said reaction zone, means responsive to the output signal of said temperature sensing means characterizing the chemical process to be controlled in terms of a temperature-preselected pressure relationship, said last-mentioned means delivering a characterized output signal corresponding to said preselected pressure at the temperature sensed by said temperature sensing means, means responsive to the output signal of said pressure sensing means and to said characterized output signal for deriving a difference signal, and pressure relieving means in communication with said reaction zone responsive to said difference signal for maintaining the pressure in said reaction zone in substantial conformance with said temperature-preselected pressure relationship.

4. A control apparatus for a chemical process according to claim 3 wherein said pressure relieving means comprises a throttling valve responsive to said difference signal and an on-off valve responsive to said difference signal at a predetermined difference signal value.

5. A control apparatus for a chemical process according to claim 3 having interlock means responsive to addition of a reactant to said reaction zone for immobilizing said means characterizing the chemical process to be controlled in terms of said temperature-preselected pressure relationship, to thereby maintain the pressure in said reaction zone substantially constant until the addition of a preselected amount of said reactant.

References Cited in the file of this patent

UNITED STATES PATENTS

| | | |
|---|---|---|
| 2,125,081 | Moore | July 26, 1938 |
| 2,125,109 | Harrison | July 26, 1938 |
| 2,410,335 | Burdick | Oct. 29, 1946 |
| 2,476,104 | Mason | July 12, 1949 |
| 2,531,257 | Cowherd | Nov. 21, 1950 |
| 2,632,456 | Breedlove | Mar. 24, 1953 |